United States Patent Office 2,767,502
Patented Oct. 23, 1956

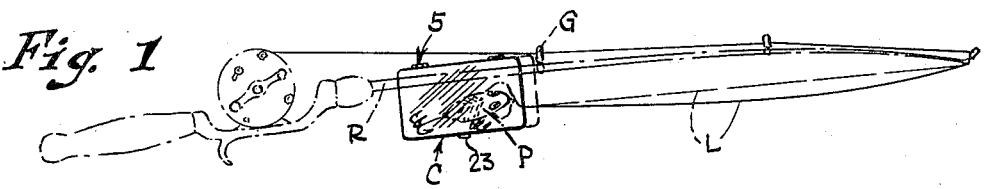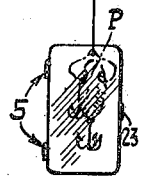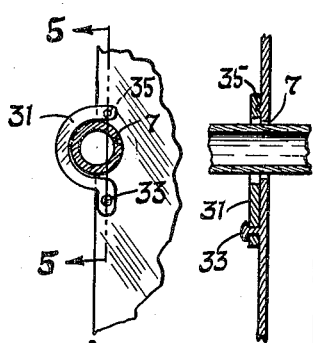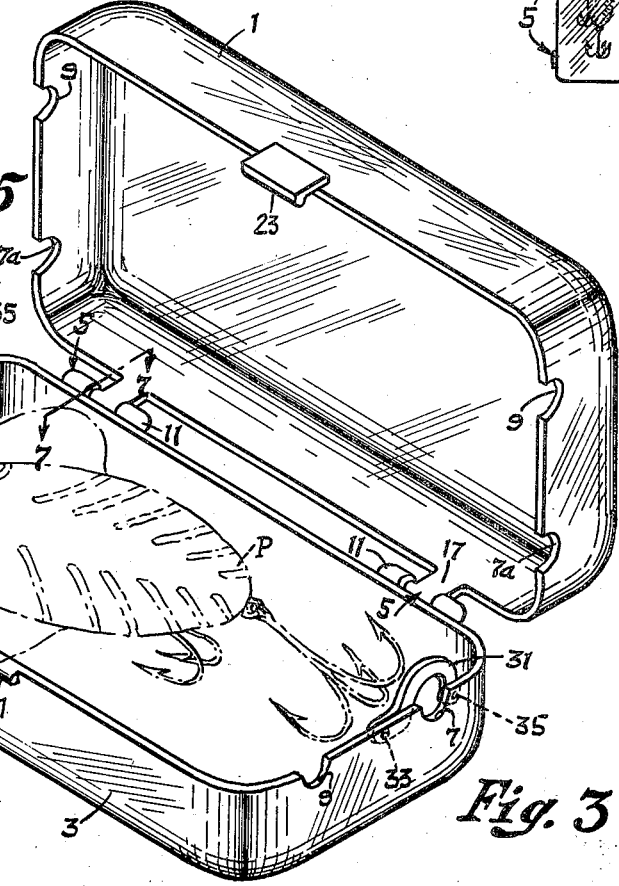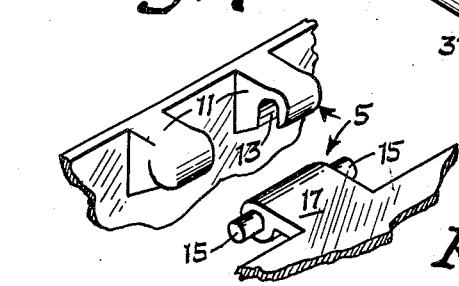

2,767,502

ROD-MOUNTABLE TRANSPARENT CASE FOR FISH LURES

Richard R. Reynolds, White's Creek, Tenn.

Application August 21, 1952, Serial No. 305,567

2 Claims. (Cl. 43—25.2)

This invention relates to a rod-mountable transparent case for fish lures. More particularly it relates to a transparent plastic case adapted to protectively hold a fish lure during its shipment, to form an attractive display case to assist its sale, and finally to constitute a protective case therefor between uses or during storage.

While it has heretofore been proposed to provide fishing rods with rod-mounted receptacles for fish lures, such containers have been special-equipment items, purchaseable as such, and usable only as rod-carried receptacles.

It is accordingly an object of this invention to provide an attractive transparent case for fish lures which is first usable as a shipping container, next usable as a sales-display case, and finally usable as a protective case for the lure when not in actual use, to protect persons from injury and the lure from damage.

It is another object to provide such a case with means for easily yet securely attaching it to a fishing rod, when desired.

These and other objects and advantages of the invention will become apparent as the following detailed description proceeds.

In the drawings, which disclose a preferred embodiment of the invention and in which the same reference characters designate like parts thruout the several views:

Fig. 1 is an elevational view showing the herein described case mounted on a conventional casting rod.

Fig. 2 is an elevational view illustrating a typical alternative use.

Fig. 3 is an enlarged perspective view of the case opened.

Fig. 4 is a partial view of the rod-clamping portion of the case.

Fig. 5 is an enlarged cross-section taken on the line 5—5 of Fig. 4.

Fig. 6 is an exploded perspective view of one of the hinges.

Fig. 7 is a view of hinge details in section taken on the line 7—7 of Fig. 3.

With reference now to the drawings, the letter C designates the transparent plastic case, which is preferably formed of upper and lower half-shell case members 1 and 3, joined as by hinges 5. The lower case member 3 is molded to have at least two semicircular notches 7 in the top edge of its end walls, which notches mate with complementary notches 7a in the upper case member 1 to form rod-receiving and -encircling holes, when the case is closed around a fishing rod R (Figs. 1, 4 and 5). Notches 7 and 7a are preferably just big enough to receive the largest rod that would normally be used with the lure sold in the case. Thus usually there would also be room for passage thru said notches of the fishing line L. However, it is preferable to provide additional pairs of notches 9 toward the front of the case to accommodate the line L, so that when the line is tightened to the dotted-line position of Fig. 1, the lure will not be jammed against the rod (and thus possibly be damaged) as would be the case if the line L passed thru the first rod opening. Tightening the line will pull the lure against the end wall of the case and will pull the case along the rod R until it engages the line-guide G (Fig. 1) to produce a rattle-free storage of the lure. Notches 9 may be small, or they may be large enough to receive the fishing rod, altho it is preferable that the rod should be in the notches nearest the hinge so that likelihood of accidental opening of the case, as by jarring, would be minimized.

The upper and lower case members 1 and 3 carry thereon mating pairs of clasp elements and hinge elements, which are preferably molded integrally therewith. The hinges 5 comprise spaced pairs of lugs 11 having depressions 13 which form bearings for the trunnions 15. Said trunnions are carried by tabs 17 extending from the upper case member 1. The snap fastener may consist of a lip bead 21 and a beaded clasp 23, of well-known construction.

If desired, one of the case members may be provided with additional means for holding the case on the rod when opened. Such means could be hook-shaped elements 31, pivotally connected to the end walls by pins 33 and held closed by mating nob-and-dimple detent means 35. Obviously hooks 31 could be mounted on the outside of the case, if desired, and if so mounted could be located to act also as means for suspending the case from an externally located fishing rod, display line, etc.

While I have disclosed an illustrative embodiment of my invention, it is to be understood that many changes can be made in the size, shape, composition and arrangement of the parts without departing from the spirit of the invention defined by the subjoined claims.

Having thus described my invention, what I claim as new and desire to secure by Letters Patent of the United States is:

1. A combined shipping, display and protective case for fish lures, comprising: a pair of elongated complementary dished case members having similar peripheral edges, said case members being hingedly connected along a pair of adjacent longer portions of said edges and adapted to swing between an open position and a closed position wherein the peripheral edges confront, to define a hollow container space at least one of said case members having a relatively large transparent wall area for visibility therethru, said case members having opposite end walls, the end walls of at least one of said case members having notches therein large enough to receive a fishing rod for passing longitudinally thru the container space and said walls in said closed position, means for releasably holding said case members in closed position, and means mounted on one of said case members adjacent said notches adapted to embracingly engage a fishing rod received in said notches to hold said case assembled therewith when open.

2. A device according to claim 1 and in which said walls have additional notches spaced from said first-mentioned notches to accommodate a fishing line and/or a fishing rod in a different position in said case.

References Cited in the file of this patent

UNITED STATES PATENTS

| | | |
|---|---|---|
| 291,604 | Knowles | Jan. 8, 1884 |
| 599,370 | Streator | Feb. 22, 1898 |
| 890,017 | Buckle | June 9, 1908 |
| 1,216,069 | Cammack | Feb. 13, 1917 |
| 1,318,007 | Gau | Oct. 7, 1919 |
| 2,125,856 | De Witt | Aug. 2, 1938 |
| 2,302,206 | Gibson et al. | Nov. 17, 1942 |
| 2,627,133 | Pletcher | Feb. 3, 1953 |